Jan. 14, 1969 A. GAAL 3,421,233
VISION TRAINING DEVICE AND METHOD FOR ACHIEVING
PARALLEL SIGHTINGS
Filed Oct. 5, 1966

INVENTOR.
Arpad Gaal
BY
AGENT

United States Patent Office 3,421,233
Patented Jan. 14, 1969

3,421,233
VISION TRAINING DEVICE AND METHOD FOR ACHIEVING PARALLEL SIGHTINGS
Arpad Gaal, 54 Figlar Ave., Fairfield, Conn. 06430
Filed Oct. 5, 1966, Ser. No. 584,573
U.S. Cl. 35—35                                    1 Claim
Int. Cl. G09b 21/00

ABSTRACT OF THE DISCLOSURE

A vision-confining device and method of conditioning a person's vision to improve facility in reading, which involves blocking the lines of sight from the eyes in all those directions extending toward a vertical median plane which is disposed centrally with respect to the eyes, to the end that there is encouraged independent vision respectively of the eyes generally in parallel lines toward a printed page held up in front.

---

This invention relates to training devices and methods for developing use of the eyes, particularly in connection with reading.

The standard procedure followed for many years, in reading a page of printed matter, has been for the reader's eyes to focus generally on relatively small areas, progressing from left to right as each line of printed matter is scanned. After each line was read, the gaze of both of the eyes would quickly move horizontally, returning to the beginning of the next line, and so forth.

Such scanning procedure is very similar to the scanning of the phosphor coating of a TV picture tube by the electron beam, wherein the beam moves mostly in horizontal directions along each consecutive line, the vertical movement being of a step-like nature and of far lesser magnitude or extent.

While the scanning of a picture tube occurs very rapidly, the somewhat similar scanning of a printed page when reading is much more time consuming and in large part accounts for what is termed "slow reading."

I have found that the reading speed of a normal person can be greatly increased by minimizing the horizontal gazing movements of the eyes and substituting instead mainly downward movements, and by developing an ability to view left and right portions of a printed page simultaneously and respectively, by the left and right eyes. Such viewing involves substantially parallel and independent lines of sight from the respective eyes, and is an ability that usually must be cultivated or developed.

One method of doing this is to mask the inner portions of the lenses of a pair of eyeglasses, and, while wearing the glasses, to view a printed page, moving the page either closer to or further from the eyes while endeavoring to achieve control of the eye muscles to effect the independent, parallel lines of vision. The masking on the eyeglasses helps to prevent a focussing of both eyes on a small area, or on common subject matter.

When a person is capable of such eye control and vision, then the rapid reading of a printed page is easily accomplished by means of a vertical scanning by the eyes, starting at the top of the page and working downward. Each eye scans mainly its own side portion of the page. Each line is scanned as a whole by both eyes, but the left eye views the left half of the line and the right eye views the right half of the line.

Objects of the invention, therefore, are to provide an improved method and means for training a person to achieve parallel sightings from the right and left eyes respectively, when viewing a printed page or the like, thereby to improve reading skill and comprehension; and to provide such a method and means which is especially adaptable as a helpful adjunct to text material directed to enlarging the eye span and developing parallel sighting for the stated purpose.

Another object of the invention is to provide an improved vision-confining device which may be successfully used for reading purposes by a person desiring to increase reading skills and comprehension even though such person is not particularly interested in training the sight for improved unaided reading.

The method and means provided by the invention are explained further in connection with the accompanying drawings, wherein:

FIG. 1 is a perspective view of a pair of eyeglasses or spectacles as provided by the invention.

FIG. 2 is a fragmentary perspective view of a pair of eyeglasses, illustrating another form of the invention.

FIG. 3 is a plan view of a template, illustrating yet another form of the invention.

FIG. 4 is a diagrammatic representation, illustrating the method of the invention utilizing a pair of spectacles made in accordance with the invention.

The ultimate objective of the invention, to develop and improve facility in reading printed or similar matter by encouraging independent sight respectively of the eyes in parallel lines, directed to separate portions of subject matter, is pictorially illustrated in FIG. 4. In this figure there is depicted an open book 10 having page 12 disposed in the line of vision of a person's eyes, which are designated respectively by the representations 14 and 16. From the person's eyes 14, 16 parallel lines of sight 18, 20 are shown, involving separate portions 22, 24 of the page 12.

I have found that when a person is able to scan a printed page or other similar matter as for the purpose of reading, in a manner such that the left portion of the page is scanned by the left eye independently of the right eye, which latter then scans the right portion of the page independently of the left eye, there results a great improvement in facility in reading, as well as a natural increase in the reading speed.

Such ability may as well be had by use of means now to be described, regardless of the degree of parallel-vision eye training which is achieved by the user.

In order to accomplish such reading improvement, and also to encourage and develop the above-mentioned independent parallel vision of the eye and condition a person's vision for the attainment of such parallel lines of sight which are independent of each other, the invention provides a novel vision-confining or directing device indicated generally by the numeral 26 in FIG. 4. Such a vision-confining device may advantageously comprise a pair of spectacles, and this is illustrated for example in FIG. 1.

In this figure, the spectacles 26 have a usual type of frame structure designated generally by the numeral 28, with lens-holding bands 30, 32 in which glass or plastic lenses 34, 36 are carried. Attached to the bands 30, 32 are bows 38, 40 of a usual type, adapted to hook over the ears of the wearer.

In accordance with the present invention, means are provided comprising masking members 42, 44 carried by the bands 30, 32 and arranged to obstruct the vision of the eyes in all those directions which may extend angularly toward a vertical median plane disposed centrally with respect to the user's eyes and the fields of sight. The masking members 42, 44 cover the innermost portions of the lenses 34, 36, having vertical edges 46, 48 which are preferably parallel with each other and which are spaced apart a distance slightly less than the spacing between the pupils of the eyes.

Considering FIG. 4, the spacing of the pupils of the eyes is indicated by the letter A, whereas the spacing between the vertical edges 46, 48 is indicated by the letter B. The arrangement is such that there is prevented convergent lines of sight from the eyes 14, 16 which would enable a focusing at one single point or relatively small area. Instead, there is permitted virtually only sight along the parallel lines 18, 20 or else sight in divergent directions away from the median plane.

The masking members 42, 44 in FIG. 1 are shown as of the clip-on type. They may be made of sheet metal or plastic sheet material, and may be attached to the spectacle frame by spring fingers 50. In place of the attachable and detachable masking members 42, 44, pieces of pressure-sensitive tape may be utilized, such as the piece of tape 52 illustrated in FIG. 2.

Another form of the invention comprises a template 54, as illustrated in FIG. 3, which may be formed of cardboard, plastic sheet material or the like, said template having the shape of a pair of spectacles and having line-of-sight openings 56, 58 which are characterized by vertical straight lines 60, 62 respectively, located to enable the template to obstruct the vision of the eyes in all those directions which extend toward a vertical median plane. The template 54 may be used by itself, or else it may be attached to a pair of spectacles, as will be understood. Also, it will be understood that the spectacles illustrated in FIGS. 1 and 2 need not have the lenses 34, 36 shown, in the event that the user's eyesight is not such as to require corrective lenses.

I have found that it requires a certain amount of practice, utilizing a specially written text for this purpose, before a person can fully attain the independent parallel vision illustrated in FIG. 4, and that the forms of the invention shown in FIGS. 1, 2 and 3 are useful in enabling a person to practice and to achieve this result. As an example, the spectacles of FIG. 1 may be worn by a subject in the usual manner, and the subject may bring a printed page in front of his line of vision, moving the page either closer to the eyes or further from the eyes while endeavoring to independently see left and right portions of the text respectively with the left and right eyes. After a certain amount of practice it will be found possible to train the eye muscles and to properly accommodate the eyes so as to effect the parallel lines of vision as shown in FIG. 4.

In the process of reading printed matter, the reader endeavors to employ the parallel lines of vision procedure, avoiding insofar as possible left to right or horizontal movements of the gaze. Instead, the printed page is to be scanned from the top downward with the least possible amount of left to right and reverse gazing movements. When this procedure is successfully attained, the reader will be able to very quickly read a printed page without this device, and simultaneously grasp the meaning of left and right portions of the lines or sentences, now without employing the conventional left-to-right movement and focusing technique heretofore employed and taught for many years. The simultaneous scanning of left and right portions of the printed page and moving the gaze from the top downward results in a very rapid reading speed and significant increase in skill and comprehension, as compared with the much slower conventional reading method wherein each line is scanned by both eyes from left to right.

The forms of the invention illustrated in FIGS. 1, 2 and 3, utilized with the method of conditioning a person's vision as set forth above will be found useful in developing a skill which greatly improves the facility of normal readers, young and old, in reading and scanning printed pages and like indicia. While three specific embodiments of the invention are illustrated herein, it will be understood that other embodiments may be devised for the above purposes, and the scope of the invention is properly to be taken in connection with the appended claims.

I claim:

1. The method of conditioning a person's vision to induce the eyes to see independently of each other in substantially parallel lines spaced apart the same distance as the eyes, so as to improve facility in reading, which includes the steps of blocking lines of sight from the eyes in all those directions which extend toward a vertical median plane disposed centrally with respect to the eyes, simultaneously supporting a page of reading matter in front of the eyes and in a plane substantially normal to said parallel lines of sight from the eyes, and repeatedly and sequentially moving the page closer to and further from the eyes thereby to encourage said independent vision respectively of the eyes in said parallel lines to separated portions of the reading matter on said page.

References Cited

UNITED STATES PATENTS

| 735,924 | 8/1903 | Von Winkler | 119—104 X |
| 2,005,649 | 6/1935 | Dragoo | 119—104 |
| 2,120,727 | 6/1938 | Bell | 351—45 |
| 2,172,287 | 9/1939 | Loy | 351—44 |
| 2,875,670 | 3/1959 | Thornton | 351—45 |
| 3,352,288 | 11/1967 | Van Kampen | 119—97 |

FOREIGN PATENTS

| 506,577 | 1/1929 | Germany. |
| 774,137 | 5/1957 | Great Britain. |

EUGENE R. CAPOZIO, *Primary Examiner.*

WALTER W. NIELSEN, *Assistant Examiner.*

U.S. Cl. X.R.

251—45